(12) United States Patent
Hirata

(10) Patent No.: US 10,516,592 B2
(45) Date of Patent: Dec. 24, 2019

(54) COMMUNICATION SYSTEM, BUS LOAD MONITORING DEVICE, AND BUS LOAD MONITORING METHOD

(71) Applicant: Renesas Electronics Corporation, Tokyo (JP)

(72) Inventor: Susumu Hirata, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 15/885,437

(22) Filed: Jan. 31, 2018

(65) Prior Publication Data
US 2018/0287922 A1 Oct. 4, 2018

(30) Foreign Application Priority Data

Mar. 31, 2017 (JP) ................. 2017-071491

(51) Int. Cl.
*H04L 12/26* (2006.01)
*H04L 12/40* (2006.01)

(52) U.S. Cl.
CPC ...... *H04L 43/0882* (2013.01); *H04L 12/4013* (2013.01); *H04L 12/40169* (2013.01); *H04L 43/062* (2013.01); *H04L 43/0823* (2013.01); *H04L 43/0876* (2013.01); *H04L 2012/40215* (2013.01); *H04L 2012/40273* (2013.01)

(58) Field of Classification Search
CPC ............... H04L 43/0882; H04L 43/062; H04L 43/0823; H04L 12/40169; H04L 43/0876; H04L 12/4013; H04L 2012/40273; H04L 2012/40215
See application file for complete search history.

(56) References Cited

U.S. PATENT DOCUMENTS 5,574,848 A * 11/1996 Thomson .......... H04L 12/40013
714/2
6,115,831 A * 9/2000 Hanf .................. B60R 16/0315
714/43
(Continued)

FOREIGN PATENT DOCUMENTS

| EP | 2 079 190 A1 | 7/2009 |
| EP | 2 827 536 A1 | 1/2015 |
| JP | 2006-287738 A | 10/2006 |

OTHER PUBLICATIONS

Extended European Search Report dated May 7, 2018 in corresponding European Application No. 18153506.3.

*Primary Examiner* — Dady Chery
(74) *Attorney, Agent, or Firm* — Mcginn I.P. Law Group, PLLC.

(57) ABSTRACT

An object of the present invention is to monitor the load of a bus with high accuracy.

A bus load monitoring device includes a determination circuit that determines whether the bus load monitoring device is in a bus-off state or a normal state, a first monitoring circuit that monitors the load of a bus when the bus load monitoring device is in the normal state, a second monitoring circuit that monitors the load of the bus when the bus load monitoring device is in the bus-off state, and a switching circuit that switches a monitoring circuit monitoring the load of the bus to the first monitoring circuit or the second monitoring circuit on the basis of the determination result of the determination circuit.

20 Claims, 11 Drawing Sheets

(56) References Cited

U.S. PATENT DOCUMENTS

| | | | | |
|---|---|---|---|---|
| 6,460,143 B1* | 10/2002 | Howard | ............... | G06F 1/3203 |
| | | | | 713/323 |
| 6,587,968 B1* | 7/2003 | Leyva | ............... | H04L 12/40032 |
| | | | | 714/43 |
| 9,566,920 B2* | 2/2017 | Melzl | ....................... | G06F 1/28 |
| 2008/0186870 A1* | 8/2008 | Butts | ................... | H04L 41/0659 |
| | | | | 370/252 |
| 2009/0147610 A1* | 6/2009 | Shikata | .................... | G06F 1/08 |
| | | | | 365/226 |
| 2012/0084596 A1* | 4/2012 | Chen | .................. | G06F 11/0745 |
| | | | | 714/2 |
| 2016/0242057 A1* | 8/2016 | Ripley | ................ | H04W 24/08 |

* cited by examiner

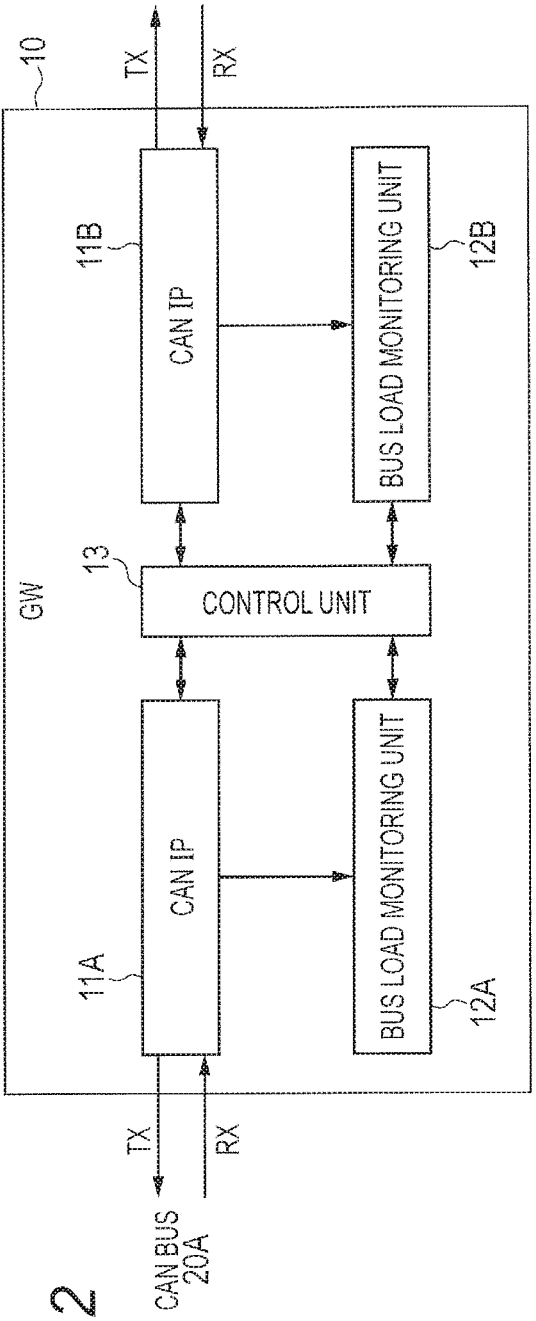
FIG. 2
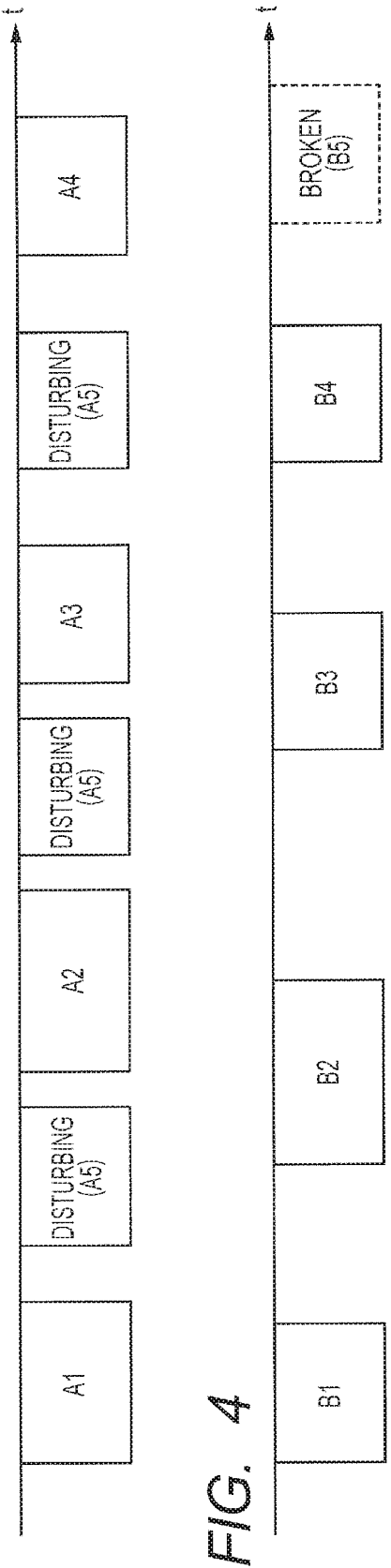
FIG. 3
FIG. 4

SIGNAL #1: RX
SIGNAL #2: BUS-OFF STATUS
SIGNAL #3: TRANSMITTING STATUS
SIGNAL #4: RECEIVING STATUS
SIGNAL #5: CAN CLOCK
REGISTER #1: BIT RATE SETTING REGISTER

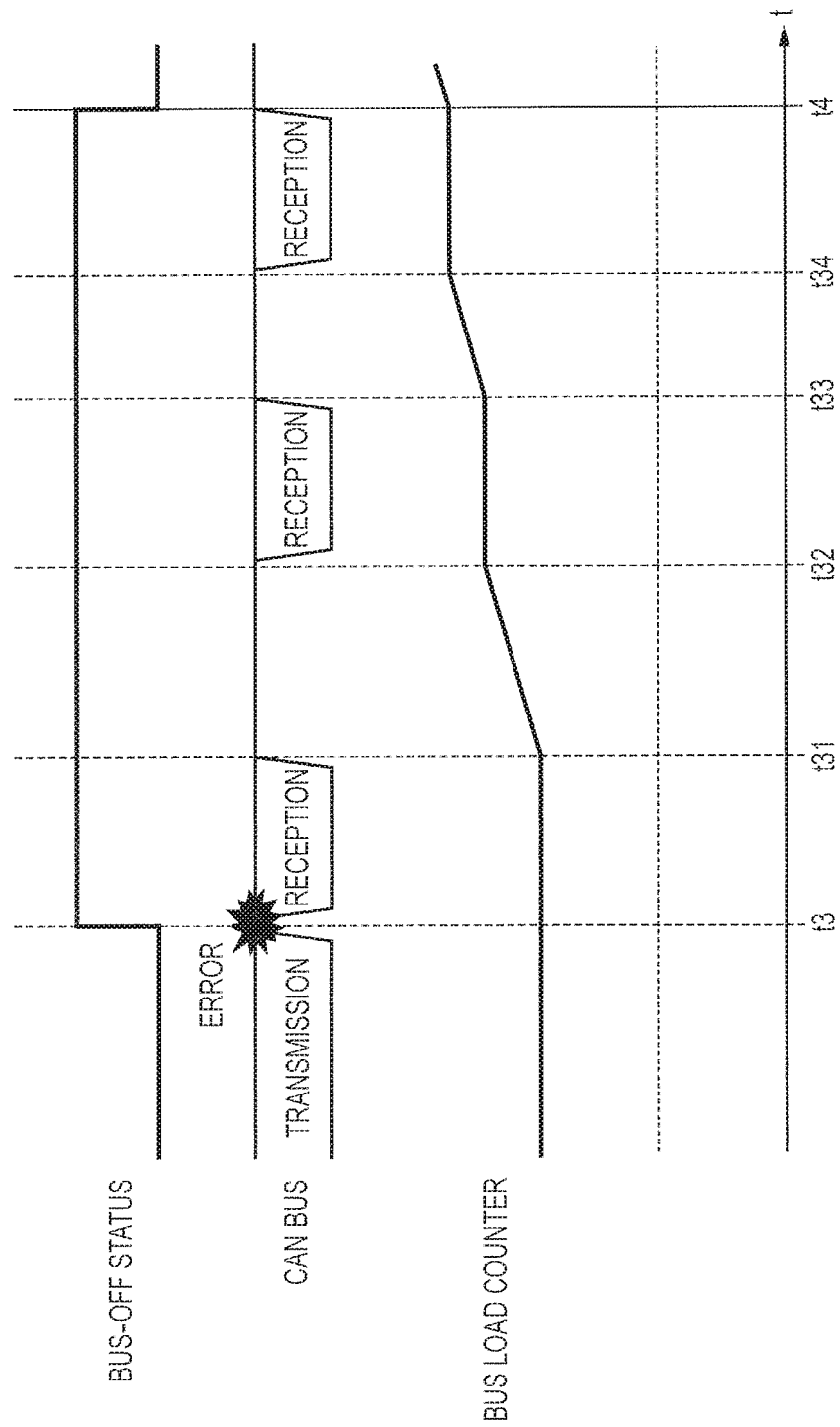

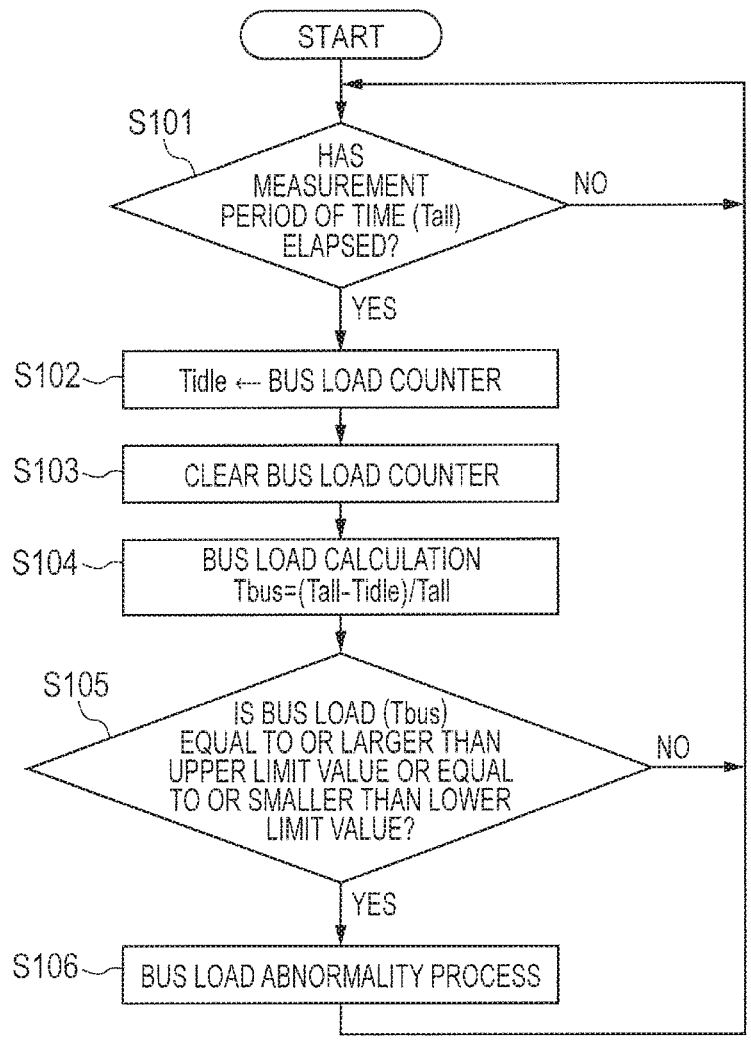
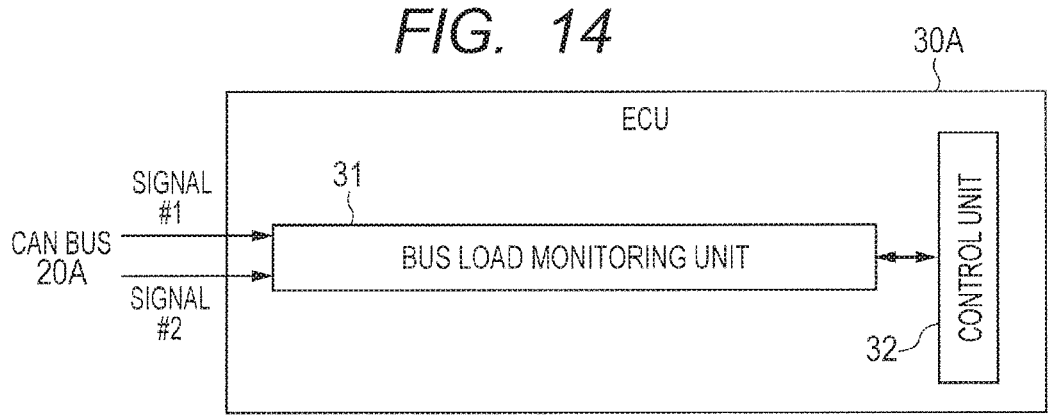

COMMUNICATION SYSTEM, BUS LOAD MONITORING DEVICE, AND BUS LOAD MONITORING METHOD

CROSS-REFERENCE TO RELATED APPLICATIONS

The disclosure of Japanese Patent Application No. 2017-071491 filed on Mar. 31, 2017 including the specification, drawings and abstract is incorporated herein by reference in its entirety.

BACKGROUND

The present invention relates to a communication system, a bus load monitoring device, and a bus load monitoring method, and can be preferably used in, for example, a bus load monitoring device that monitors the load of a CAN (Controller Area Network) bus.

As one of in-vehicle LANs (Local Area Networks) mounted in a car, a CAN has been known. In the CAN, a plurality of ECUs (Electronic Control Units) controlling each of a plurality of systems such as an engine system and a steering wheel/brake system is coupled to a CAN bus. Further, the CAN buses are coupled to each other via a GW (Gateway).

In recent years, response to security has been required for cars, and the needs of monitoring the load of the CAN bus have been increased as part of security.

As a related technique of monitoring the load of the CAN bus, there is a technique disclosed in, for example, Japanese Unexamined Patent Application Publication No. 2006-287738. According to Japanese Unexamined Patent Application Publication No. 2006-287738, a GW monitors the load of a CAN bus.

SUMMARY

In the meantime, the ECU or the GW occasionally becomes a bus-off state in the CAN. The bus-off state is a state in which the ECU or the GW cannot participate in communications of the CAN bus.

In the technique described in Japanese Unexamined Patent Application Publication No. 2006-287738, however, the GW monitors the load of the CAN bus without distinguishing whether or not the GW is in the bus-off state. Thus, there has been a problem that the GW cannot monitor the load of the CAN bus with high accuracy.

The other problems and novel features will become apparent from the description of the specification and the accompanying drawings.

According to an embodiment, a bus load monitoring device includes a first monitoring circuit that monitors the load of a bus when the bus load monitoring device is in a normal state, and a second monitoring circuit that monitors the load of the bus when the bus load monitoring device is in a bus-off state. Further, the bus load monitoring device determines whether the bus load monitoring device is in the bus-off state or the normal state, and switches a monitoring circuit monitoring the load of the bus to the first monitoring circuit or the second monitoring circuit on the basis of the determination result.

According to the embodiment, the present invention can contribute to solving the above-described problems.

BRIEF DESCRIPTION OF THE DRAWINGS

FIG. 2 is a diagram for showing a configuration example of a GW according to the first embodiment;

FIG. 3 is a diagram for showing an example in which signals transmitted to a CAN bus are arranged in chronological order;

FIG. 4 is a diagram for showing another example in which signals transmitted to the CAN bus are arranged in chronological order;

FIG. 12 is a diagram for showing the counting operation in detail in the period of time from the time t3 to the time t4 of FIG. 11;

FIG. 13 is a flowchart for showing an example of a processing flow of the GW according to the first embodiment;

FIG. 14 is a diagram for showing a configuration example of an ECU according to a second embodiment;

DETAILED DESCRIPTION

Hereinafter, embodiments will be described. It should be noted that the following description and drawings are appropriately omitted and simplified for clarifying the explanation. In addition, the same constitutional elements are followed by the same signs in each drawing, and the repeated explanation will be omitted as needed.

(1) First Embodiment

<Entire Configuration of Communication System According to First Embodiment>

A communication system according to a first embodiment is supposed to be mounted in a car as an in-vehicle system using a CAN.

Figure 1:
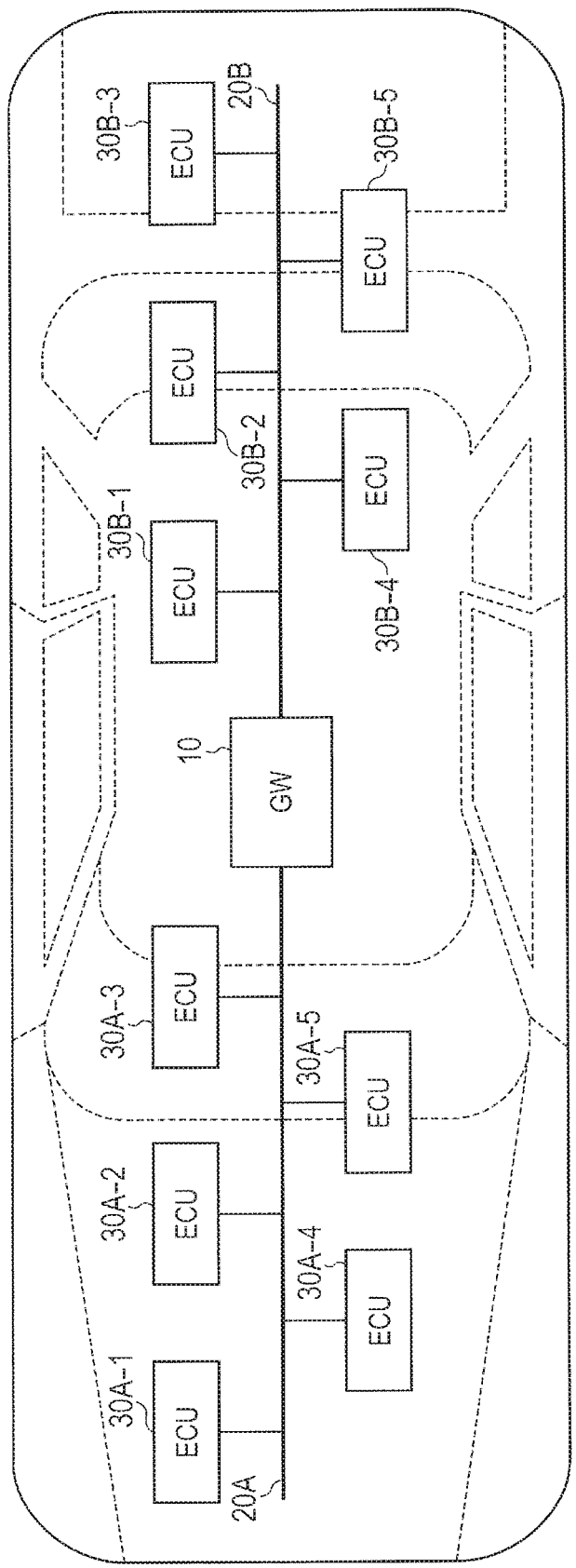
FIG. 1 is a diagram for showing an entire configuration example of a communication system according to a first embodiment.

First, an entire configuration example of the communication system according to the first embodiment will be described with reference to FIG. 1. As shown in FIG. 1, the communication system according to the first embodiment includes a GW 10, CAN buses 20A and 20B, and ECUs 30A-1 to 30A-5 and 30B-1 to 30B-5. Hereinafter, the ECUs 30A-1 to 30A-5 are appropriately referred to as an ECU 30A unless otherwise specified. In addition, the ECUs 30B-1 to 30B-5 are appropriately referred to as an ECU 30B unless otherwise specified. Further, two CAN buses 20A and 20B are provided in FIG. 1. However, the number of CAN buses is limited to this, but may be two or more. Further, five ECUs 30A are provided. However, the number of ECUs 30A is not limited to this, but may be one or more. Further, five ECUs 30B are provided. However, the number of ECUs 30B is not limited to this, but may be one or more.

The ECUs 30A and 30B are ECUs controlling each of systems such as an engine system and a steering wheel/brake system. The ECU 30A is an ECU coupled to the CAN bus 20A, and the ECU 30B is an ECU coupled to the CAN bus 20B.

The GW 10 is a GW that couples the CAN buses 20A and 20B to each other and monitors the load of each of the CAN buses 20A and 20B. The GW 10 is an example of a bus load monitoring device or a first bus load monitoring device.

<Configuration of GW 10 According to First Embodiment>

Next, a configuration example of the GW 10 according to the first embodiment will be described with reference to FIG. 2. As shown in FIG. 2, the GW 10 includes CAN IPs (Intellectual Properties) 11A and 11B, bus load monitoring units 12A and 12B, and a control unit 13.

The CAN IP 11A is a module necessary for participating in communications of the CAN bus 20A. It should be noted that the ECU 30A also needs to have a CAN IP in order to participate in communications of the CAN bus 20A. It is assumed that each of five ECUs 30A participates in communications of the CAN bus 20A and has a CAN IP in the first embodiment.

The bus load monitoring unit 12A is a module that monitors the load of the CAN bus 20A by using information obtained from the CAN IP 11A.

The CAN IP 11B is a module necessary for participating in communications of the CAN bus 20B. It should be noted that the ECU 30B also needs to have a CAN IP in order to participate in communications of the CAN bus 20B. It is assumed that each of five ECUs 30B participates in communications of the CAN bus 20B and has a CAN IP in the first embodiment.

The bus load monitoring unit 12B is a module that monitors the load of the CAN bus 20B by using information obtained from the CAN IP 11B. The control unit 13 is a module that controls the CAN IPs 11A and 11B and the bus load monitoring units 12A and 12B.

In the first embodiment, for example, five ECUs 30A participate in communications in the CAN bus 20A, and can transmit and receive signals. However, in the case where any one of five ECUs 30A is an unauthorized ECU 30A, the load of the CAN bus 20A is abnormally increased due to the unauthorized ECU 30A in some cases. An example thereof will be described with reference to FIG. 3. FIG. 3 is a diagram for showing an example in which signals transmitted to the CAN bus 20A are arranged in chronological order, and, for example, "A1" in the drawing denotes a signal transmitted from the ECU 30A-1 to the CAN bus 20A (this also applies to FIG. 4). In the example of FIG. 3, the ECU 30A-5 is an unauthorized ECU 30A, and repeatedly transmits a disturbing signal to the CAN bus 20A. Therefore, the load of the CAN bus 20A is abnormally increased. It should be noted that the load of the CAN bus 20B may be abnormally increased due to the unauthorized ECU 30B even in the CAN bus 20B as the example of FIG. 3.

In addition, five ECUs 30B participate in communications even in the CAN bus 20B, and can transmit and receive signals. However, in the case where any one of five ECUs 30B is broken, the load of the CAN bus 20B is abnormally decreased due to the broken ECU 30B in some cases. An example thereof will be described with reference to FIG. 4. In the example of FIG. 4, the ECU 30B-5 is a broken ECU 30B, and cannot transmit signals to the CAN bus 20B. Therefore, the load of the CAN bus 20B is abnormally decreased. It should be noted that the load of the CAN bus 20A may be abnormally decreased due to the broken ECU 30A even in the CAN bus 20A as the example of FIG. 4.

The bus load monitoring unit 12A monitors the abnormal increase or decrease in the load of the CAN bus 20A as described above, and the bus load monitoring unit 12B monitors the abnormal increase or decrease in the load of the CAN bus 20B as described above.

Hereinafter, the bus load monitoring units 12A and 12B according to the first embodiment will be described in detail. Here, in order to facilitate understanding of the bus load monitoring units 12A and 12B, a bus load monitoring unit according to a comparative example examined by the inventors will be described first.

<Bus Load Monitoring Unit 900 According to Comparative Example>

It is assumed that a bus load monitoring unit 900 according to the comparative example monitors the load of the CAN bus 20A as similar to the bus load monitoring unit 12A.

<Counting Operation by Bus Load Monitoring Unit 900 According to Comparative Example>

The bus load monitoring unit 900 allows a bus load counter 901 (see FIG. 6 to be described later) to count a period of time during which the CAN bus 20A is transmitting or receiving signals to/from the GW 10 by using a transmitting status and a receiving status obtained from the CAN IP 11A. It should be noted that the transmitting status indicates whether or not the GW 10 is transmitting signals to the CAN bus 20A, and the receiving status indicates whether or not the GW 10 is receiving signals from the CAN bus 20A.

Figure 5:
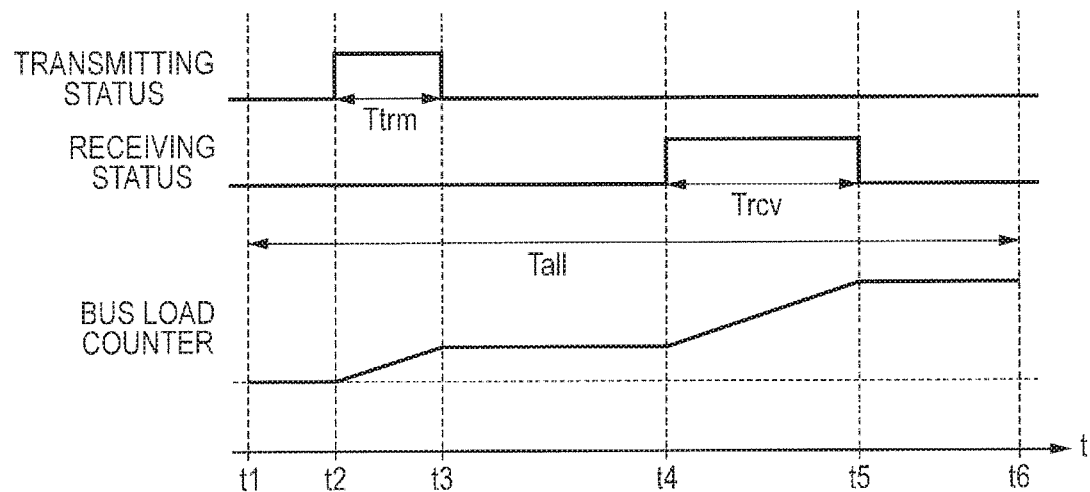
FIG. 5 is a diagram for showing an example of a counting operation by a bus load monitoring unit in a GW according to a comparative example.

With reference to FIG. 5, an example of the counting operation by the bus load monitoring unit 900 according to the comparative example will be described. In the example of FIG. 5, the transmitting status is "1" indicating that signals are being transmitted in the period of time from the time t2 to the time t3. Therefore, the bus load monitoring unit 900 sets the period of time from the time t2 to the time t3 as a transmitting period of time (Ttrm), and allows the bus load counter 901 to count the period of time. In addition, the receiving status is "1" indicating that signals are being received in the period of time from the time t4 to the time t5. Therefore, the bus load monitoring unit 900 sets the period of time from the time t4 to the time t5 as a receiving period of time (Trcv), and allows the bus load counter 901 to count the period of time.

If the period of time counted by the bus load counter 901 is used, a bus load (Tbus) that shows a ratio of the period of time during which the CAN bus 20A is transmitting or receiving signals to/from the GW 10 to all measurement periods of time (Tall corresponding to the period of time from the time t1 to the time t6 in FIG. 5) can be calculated by the following formula.

$$\text{bus load } (Tbus) = (\text{transmitting period of time } (Ttrm) + \text{receiving period of time } (Trcv))/\text{all measurement periods of time } (Tall) = \text{bus load counter}/\text{all measurement periods of time } (Tall)$$

<Configuration of Bus Load Monitoring Unit 900 According to Comparative Example>

Figure 6:
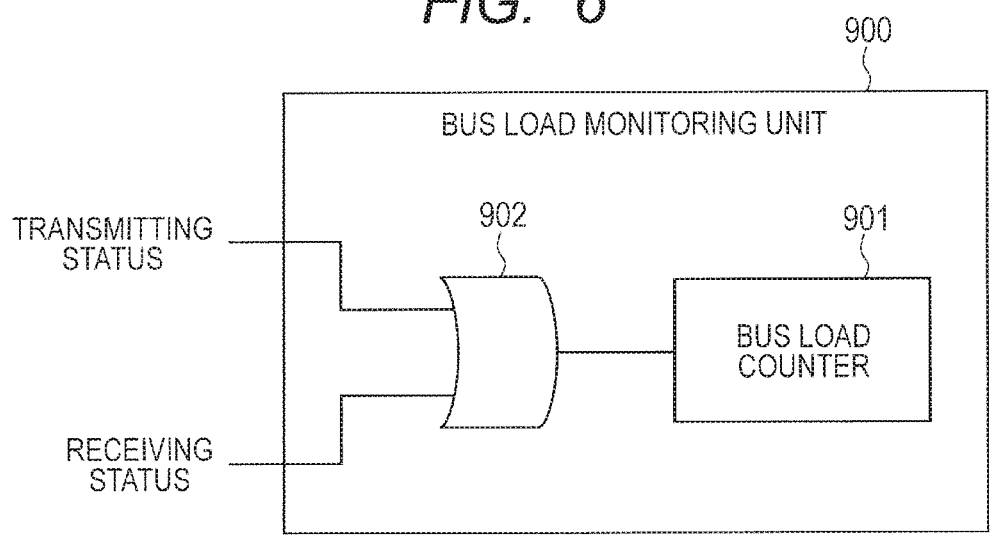
FIG. 6 is a diagram for showing a configuration example of the bus load monitoring unit in the GW according to the comparative example.

Next, a configuration example of the bus load monitoring unit 900 according to the comparative example will be described with reference to FIG. 6. As shown in FIG. 6, the bus load monitoring unit 900 according to the comparative example includes the bus load counter 901 and an OR circuit 902. The OR circuit 902 outputs "1" in the case where at least one of the transmitting status and the receiving status obtained from the CAN IP 11A is "1". "1" of the transmitting status indicates that signals are being transmitted, and "1" of the receiving status indicates that signals are being received. Therefore, the OR circuit 902 outputs "1" in the case where the transmitting status indicates that signals are being transmitted or the receiving status indicates that signals are being received. The bus load counter 901 counts the period of time during which "1" is output from the OR circuit 902, namely, the period of time during which the transmitting status indicates that signals are being transmitted or the receiving status indicates that signals are being received.

Figure 7:
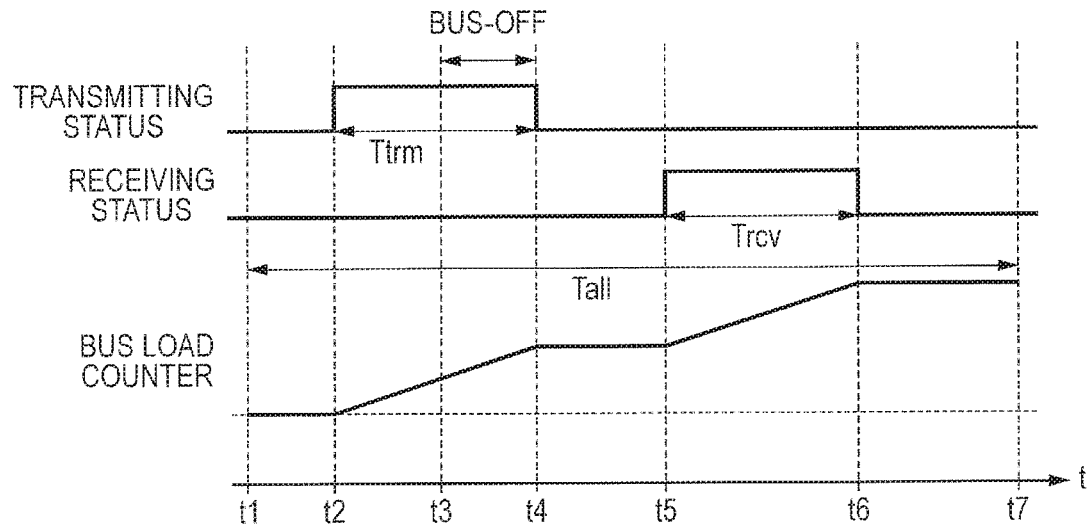
FIG. 7 is a diagram for showing another example of the counting operation by the bus load monitoring unit in the GW according to the comparative example.

As described above, the bus load monitoring unit 900 determines whether or not the CAN bus 20A is transmitting or receiving signals to/from the GW 10 using the states of the transmitting status and the receiving status of the GW 10. Therefore, in the case where the state of the GW 10 is different from the state of the CAN bus 20A, there is a risk that erroneous counting occurs. An example thereof will be described with reference to FIG. 7. In the example of FIG. 7, the transmitting status is "1" in the period of time from the time t2 to the time t4. Therefore, the bus load monitoring unit 900 sets the period of time from the time t2 to the time t4 as the transmitting period of time (Ttrm), and allows the bus load counter 901 to count the period of time. However, the GW 10 is actually in a bus-off state in the period of time from the time t3 to the time t4. Therefore, the GW 10 can neither participate in communications of the CAN bus 20A nor transmit signals to the CAN bus 20A. At this time, if any one of five ECUs 30A does not transmit signals to the CAN bus 20A, the CAN bus 20A becomes the idle state. In such a case, the period of time from the time t3 to the time t4 is originally not to be counted by the bus load counter 901. However, the bus load counter 901 counts the period of time, and erroneous counting occurs.

According to the bus load monitoring units 12A and 12B of the first embodiment, the above-described problems can be solved.

<Bus Load Monitoring Units 12A and 12B According to First Embodiment>

Hereinafter, the bus load monitoring units 12A and 12B according to the first embodiment will be described. It should be noted that the bus load monitoring units 12A and 12B monitor different CAN buses, but the configurations thereof are the same. Therefore, the configuration of the bus load monitoring unit 12A will be described as an example in the following description, and the explanation of the configuration of the bus load monitoring unit 12B will be omitted.

<Configuration of Bus Load Monitoring Unit 12A According to First Embodiment>

First, an example of information obtained from the CAN IP 11A by the bus load monitoring unit 12A according to the first embodiment in order to monitor the load of the CAN bus 20A will be described with reference to FIG. 8.

Figure 8:
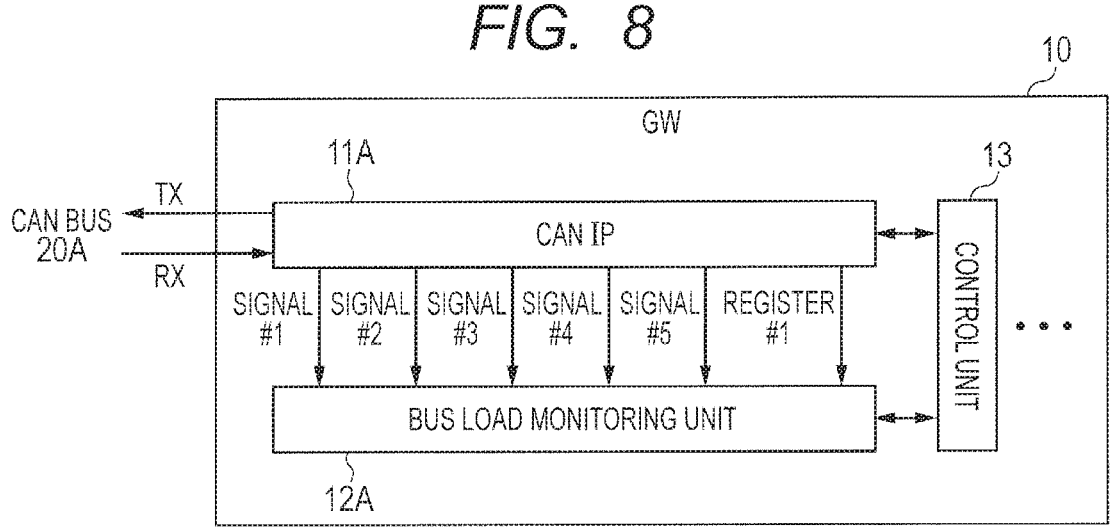
FIG. 8 is a diagram for showing an example of information obtained from a CAN IP by a bus load monitoring unit in the GW according to the first embodiment.

As shown in FIG. 8, the bus load monitoring unit 12A obtains information from the CAN IP 11A using signals #1 to #5 and a register #1.

A reception signal Rx received from the CAN bus 20A by the GW 10 is obtained from the signal #1. A bus-off status indicating whether or not the GW 10 is in the bus-off state is obtained from the signal #2. The transmitting status indicating whether or not the GW 10 is transmitting signals to the CAN bus 20A is obtained from the signal #3. The receiving status indicating whether or not the GW 10 is receiving signals from the CAN bus 20A is obtained from the signal #4. A CAN clock is obtained from the signal #5. Information stored in a bit rate setting register (not shown) included in the CAN IP 11A is obtained from the register #1.

The bus load monitoring unit 12A allows a bus load counter 125 (see FIG. 9 to be described later) to count a period of time during which the CAN bus 20A is in the idle state by using the information obtained through the signals #1 to #5 and the register #1 from the CAN IP 11A.

Figure 9:
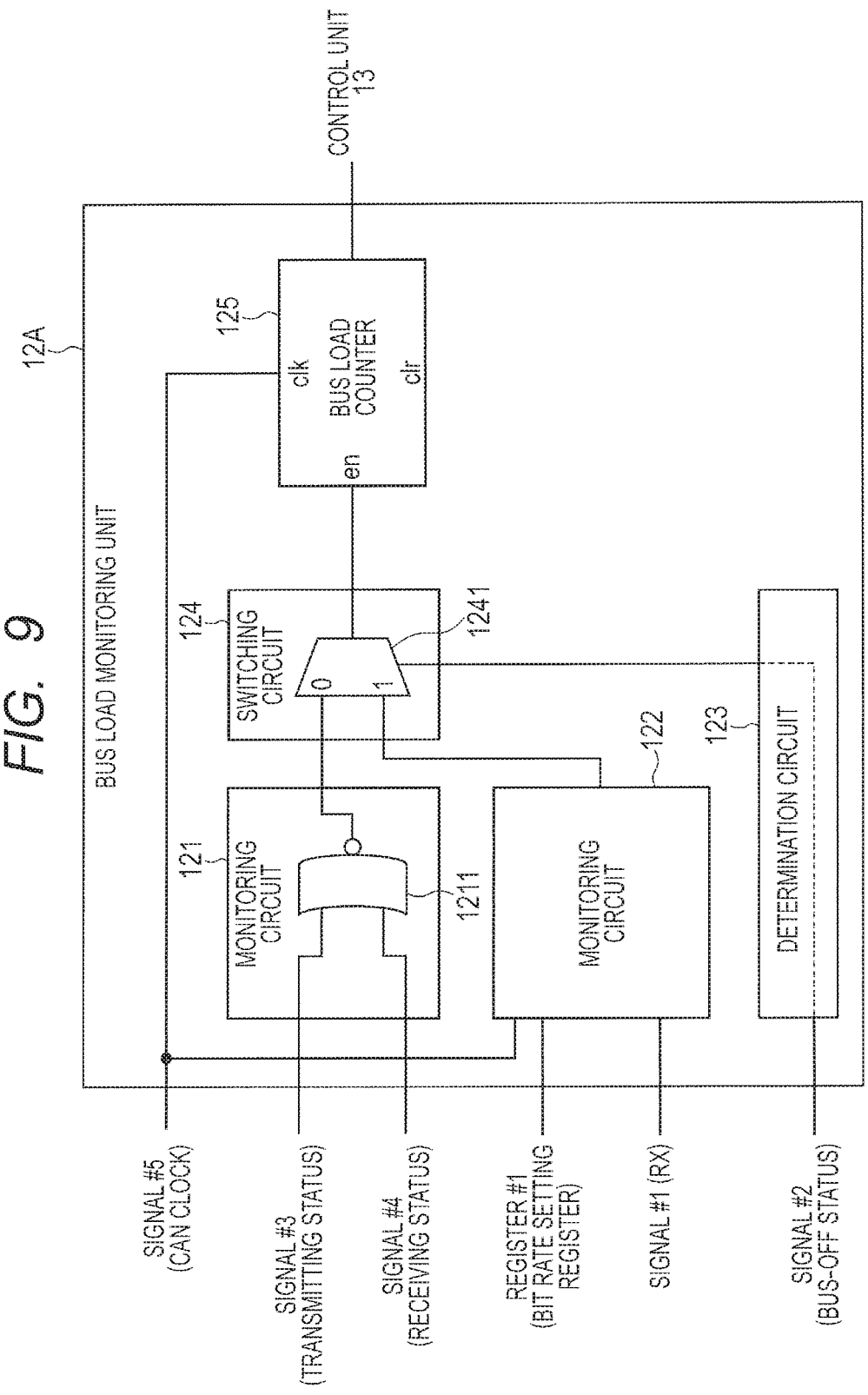
FIG. 9 is a diagram for showing a configuration example of the bus load monitoring unit in the GW according to the first embodiment.

Next, a configuration example of the bus load monitoring unit 12A according to the first embodiment will be described with reference to FIG. 9. As shown in FIG. 9, the bus load monitoring unit 12A includes a monitoring circuit 121, a monitoring circuit 122, a determination circuit 123, a switching circuit 124, and the bus load counter 125. It should be noted that a state in which the GW 10 is not in the bus-off state is defined as a normal state in the first embodiment.

The monitoring circuit 121 is a circuit that monitors the load of the CAN bus 20A when the GW 10 is in the normal state. The monitoring circuit 121 is an example of a first monitoring circuit. The monitoring circuit 121 includes an NOR circuit 1211. The NOR circuit 1211 outputs "1" in the case where both the transmitting status and the receiving status are "0". Here, "1" of the transmitting status indicates that signals are being transmitted, and "1" of the receiving status indicates that signals are being received. Therefore, the monitoring circuit 121 determines that the CAN bus 20A is in the idle state in the case where the transmitting status does not indicate that signals are being transmitted and the receiving status does not indicate that signals are being received, and thus outputs "1".

The monitoring circuit 122 is a circuit that monitors the load of the CAN bus 20A when the GW 10 is in the bus-off state. The monitoring circuit 122 is an example of a second monitoring circuit. The monitoring circuit 122 outputs "1" in the case where 11 or more recessive bits (bits of "1") are detected in the reception signal Rx received from the CAN bus 20A by the GW 10. In the CAN, a state after continuous 11 recessive bits are detected in the CAN bus is defined as the idle state by the standard. Therefore, the CAN bus 20A becomes the idle state after 11 or more recessive bits are detected in the reception signal Rx. Therefore, in the case where 11 or more recessive bits are detected in the reception signal Rx, the monitoring circuit 122 determines that the CAN bus 20A is in the idle state, and outputs "1".

The determination circuit 123 is a circuit that determines whether the GW 10 is in the bus-off state or the normal state on the basis of the bus-off status. Here, "1" of the bus-off status indicates the bus-off state, and "0" indicates the normal state. Therefore, if the bus-off status is "1", the GW 10 can be determined as the bus-off state. If the bus-off status is "0", the GW 10 can be determined as the normal state. The determination circuit 123 outputs the bus-off status as it is in the first embodiment. However, the present invention is not limited to this, but the determination circuit 123 may determine whether the GW 10 is in the bus-off state or the normal state on the basis of the bus-off status, may newly generate a signal indicating the determination result, and may output the newly-generated signal.

The switching circuit 124 is a circuit that switches the monitoring circuit for monitoring the load of the CAN bus 20A to either the monitoring circuit 121 or the monitoring circuit 122 on the basis of the output of the determination circuit 123. The switching circuit 124 includes a selector 1241. If the output of the determination circuit 123 is "1", the selector 1241 selects and outputs the output of the monitoring circuit 122. If the output of the determination circuit 123 is "0", the selector 1241 selects and outputs the output of the monitoring circuit 121. Here, "1" of the output of the determination circuit 123 indicates the bus-off state, and "0" indicates the normal state. Further, "1" of the output of each of the monitoring circuit 121 and the monitoring circuit 122 indicates that the CAN bus 20A is determined as the idle state. Therefore, when the GW 10 is in the bus-off state, the switching circuit 124 outputs "1" in the case where the monitoring circuit 122 determines that the CAN bus 20A is in the idle state. When the GW 10 is in the normal state, the switching circuit 124 outputs "1" in the case where the monitoring circuit 121 determines that the CAN bus 20A is in the idle state.

The bus load counter 125 counts the period of time during which "1" is output from the selector 1241 of the switching circuit 124 in synchronization with the CAN clock. The bus load counter 125 is an example of a first bus load counter. Therefore, the bus load counter 125 counts the period of time during which the monitoring circuit 122 determines that the CAN bus 20A is in the idle state when the GW 10 is in the bus-off state, and counts the period of time during which the monitoring circuit 121 determines that the CAN bus 20A is in the idle state when the GW 10 is in the normal state.

<Configuration of Monitoring Circuit 122 According to First Embodiment>

Figure 10:
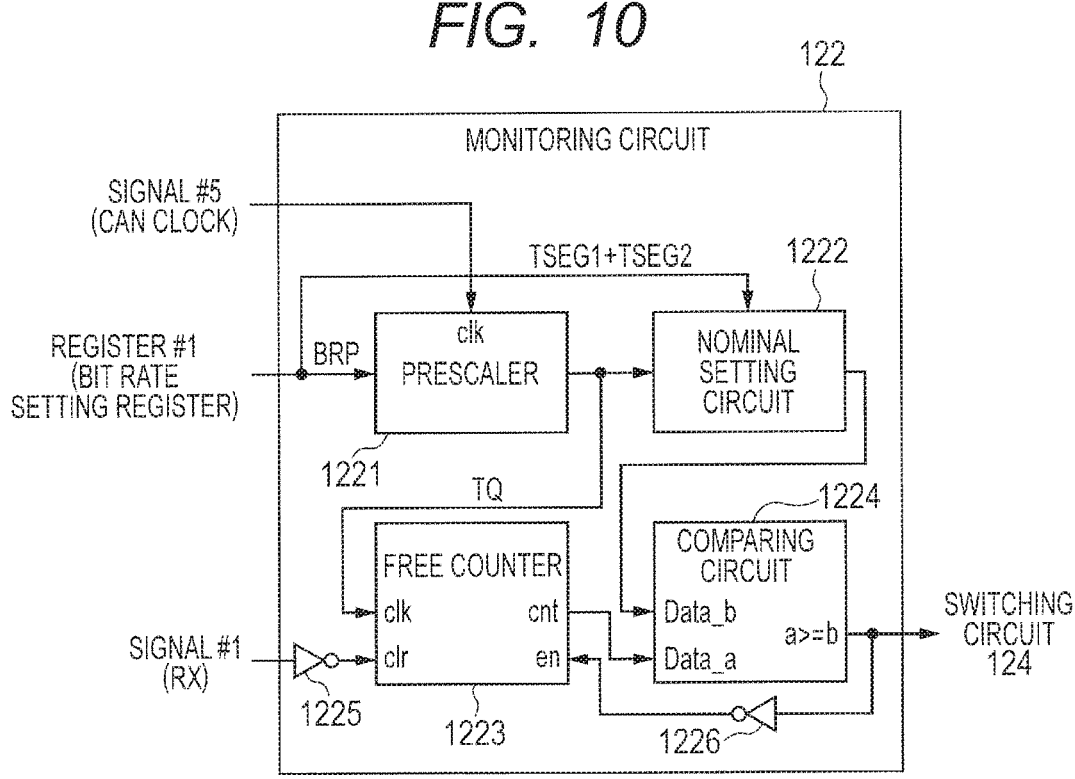
FIG. 10 is a diagram for showing a configuration example of a monitoring circuit in the GW according to the first embodiment.

Next, a configuration example of the monitoring circuit 122 according to the first embodiment will be described with reference to FIG. 10. As shown in FIG. 10, the monitoring circuit 122 includes a prescaler 1221, a nominal setting circuit 1222, a free counter 1223, a comparing circuit 1224, and NOT circuits 1225 and 1226.

The prescaler 1221 generates TQ (Time Quanta) by dividing the CAN clock by a value obtained by adding "1" to a BRP (Baud Rate Prescaler) value stored in the bit rate setting register (not shown) included in the CAN IP 11A. The prescaler 1221 outputs the generated TQ to the nominal setting circuit 1222 and the free counter 1223.

The nominal setting circuit 1222 multiplies the 1-bit TQ number by 11 on the basis of TSEG (Time Segment) 1 and TSEG 2 stored in the bit rate setting register (not shown) included in the CAN IP 11A to set an 11-bit nominal value. The nominal setting circuit 1222 outputs the 11-bit nominal value to the comparing circuit 1224.

The free counter 1223 counts up the count value every time the TQ output from the prescaler 1221 and input to a clk terminal becomes "1", and outputs the count value from a cnt terminal to the comparing circuit 1224.

The comparing circuit 1224 compares the count value output from the cnt terminal of the free counter 1223 and input from a Data_a terminal with the 11-bit nominal value output from the nominal setting circuit 1222 and input from a Data_b terminal. The comparing circuit 1224 outputs "1" when the count value input from the Data_a terminal becomes equal to or larger than the 11-bit nominal value input from the Data_b terminal. The output of the comparing circuit 1224 corresponds to the output of the monitoring circuit 122.

The NOT circuit 1225 inverts the reception signal Rx received from the CAN bus 20A by the GW 10. Therefore, the output of the NOT circuit 1225 becomes "1" when detecting the falling edge of the reception signal Rx. The NOT circuit 1225 outputs the inverted signal to the free counter 1223.

The NOT circuit 1226 inverts the output of the comparing circuit 1224. Therefore, the output of the NOT circuit 1226 becomes "0" when the count value counted by the free counter 1223 becomes equal to or larger than the 11-bit nominal value. The NOT circuit 1226 outputs the inverted signal to the free counter 1223.

The free counter 1223 clears the count value when the signal output from the NOT circuit 1225 and input from the clr terminal becomes "1", namely, when detecting the falling edge of the reception signal Rx.

Further, the free counter 1223 stops the counting operation when the signal output from the NOT circuit 1226 and input from an en terminal becomes "0", namely, when the count value counted by the free counter 1223 becomes equal to or larger than the 11-bit nominal value.

As described above, the monitoring circuit 122 outputs "1" in the case where the 11 recessive bits are detected in the reception signal Rx received from the CAN bus 20A by the GW 10. Thereafter, the monitoring circuit 122 maintains the output "1" until the falling edge of the reception signal Rx is detected. As described above, the monitoring circuit 122 outputs "1" in the case where the 11 or more recessive bits are detected in the reception signal Rx.

<Counting Operation by Bus Load Monitoring Unit 12A According to First Embodiment>

Figure 11:
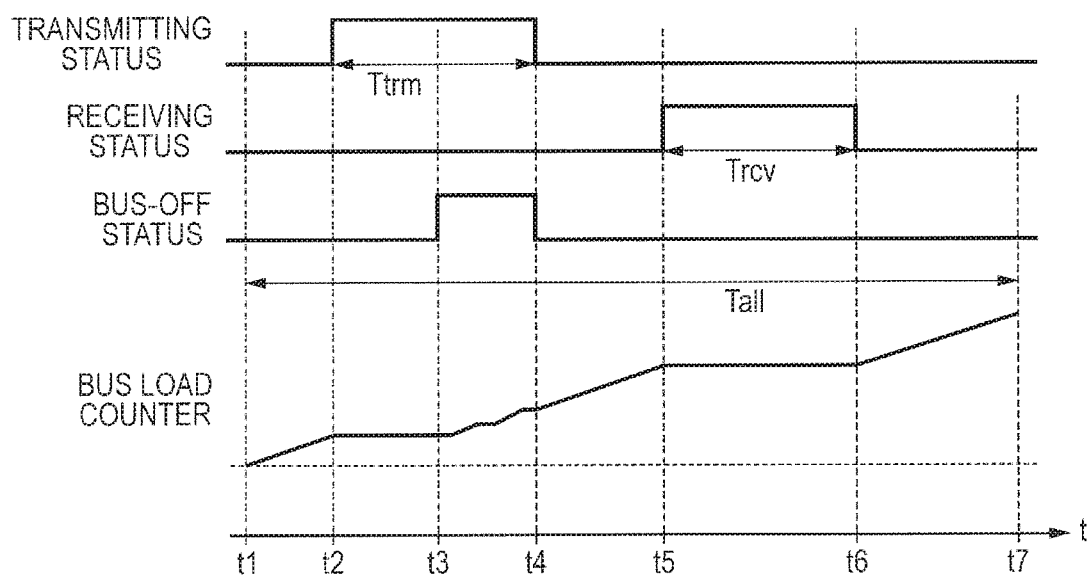
FIG. 11 is a diagram for showing an example of the counting operation by the bus load monitoring unit in the GW according to the first embodiment.

Next, an example of a counting operation by the bus load monitoring unit 12A according to the first embodiment will be described with reference to FIG. 11. In the example of FIG. 11, the transmitting status is "1" indicating that signals are being transmitted in the period of time from the time t2 to the time t4. However, the bus-off status is "1" indicating the bus-off state in the period of time from the time t3 to the time t4. In addition, the receiving status is "1" indicating that signals are being received in the period of time from the time t5 to the time t6.

Therefore, in the bus load monitoring unit 12A, the monitoring circuit 122 monitors the load of the CAN bus 20A in the period of time from the time t3 to the time t4 during which the GW 10 is in the bus-off state. On the other hand, the monitoring circuit 121 monitors the load of the CAN bus 20A in the periods of time from the time t1 to the time t3 and from the time t4 to the time t7 during which the GW 10 is in the normal state.

First, the counting operation in the case where the GW 10 is in the normal state will be described. The transmitting status does not indicate "1" indicating that signals are being transmitted and the receiving status also does not indicate "1" indicating that signals are being received in the periods of time from the time t1 to the time t2, from the time t4 to the time t5, and from the time t6 to the time t7. Therefore, the monitoring circuit 121 determines that the CAN bus 20A is in the idle state in these periods of time, and the bus load counter 125 counts these periods of time.

Next, the counting operation in the case where the GW 10 is in the bus-off state will be described with reference to FIG. 12. FIG. 12 shows the counting operation in detail in the period of time from the time t3 to the time t4 during which the GW 10 is in the bus-off state in FIG. 11.

The GW 10 cannot participate in communications of the CAN bus 20A in the bus-off state. During that time, however, the ECU 30A coupled to the CAN bus 20A can transmit signals to the CAN bus 20A. Therefore, the GW 10 can receive the signal transmitted from the ECU 30A to the CAN bus 20A as the reception signal Rx even in the bus-off state.

Accordingly, the monitoring circuit 122 monitors the load of the CAN bus 20A using the reception signal Rx in the bus-off state. Specifically, in the CAN, a state after continuous 11 recessive bits are detected in the CAN bus is defined as the idle state by the standard. Therefore, the CAN bus 20A becomes the idle state after the 11 recessive bits are detected in the reception signal Rx. Accordingly, in the case where the 11 recessive bits are detected in the reception signal Rx, the monitoring circuit 122 thereafter determines that the CAN bus 20A is in the idle state in the period of time until the falling edge of the reception signal Rx is detected, and the bus load counter 125 counts the period of time.

The example of FIG. 12 is an example in which the monitoring circuit 122 detects the 11 recessive bits in the reception signal Rx at the time t31 and detects the falling edge of the reception signal Rx at the time t32. Therefore, the monitoring circuit 122 determines that the CAN bus 20A is in the idle state in the period of time from the time t31 to the time t32, and the bus load counter 125 counts the period of time from the time t31 to the time t32. Likewise, the monitoring circuit 122 determines that the CAN bus 20A is in the idle state in the period of time from the time t33 to the time t34, and the bus load counter 125 counts the period of time from the time t33 to the time t34.

If the period of time counted by the bus load counter 125 is used, a bus load (Tbus) that shows a ratio of the period of time during which the CAN bus 20A is transmitting or receiving signals to/from the GW 10 to all measurement periods of time (Tall corresponding to the period of time from the time t1 to the time t7 in FIG. 11) can be calculated by the following formula.

bus load (Tbus)=(all measurement periods of time (Tall)−bus load counter (Tidle))/all measurement periods of time (Tall)

As described above, the bus load counter 125 according to the first embodiment counts the period of time during which the CAN bus 20A is in the idle state. Thus, the bus load counter 125 is different in formula from the bus load counter 901 according to the comparative example that counts the period of time during which the CAN bus 20A is transmitting or receiving signals to/from the GW 10.

<Processing Flow of GW 10 According to First Embodiment>

Next, an example of a processing flow of the GW 10 according to the first embodiment will be described with reference to FIG. 13. It should be noted that FIG. 13 shows a processing flow of a process that is performed on the basis of the monitoring result of the load of the CAN bus 20A.

As shown in FIG. 13, the control unit 13 determines whether or not a predetermined measurement period of time (Tall) has elapsed (Step S101). In the case where the measurement period of time (Tall) has not elapsed (No in Step S101), the flow returns to Step S101.

In the case where the measurement period of time (Tall) has elapsed (Yes in Step S101) in Step S101, the control unit 13 sets the period of time counted by the bus load counter 125 at that time to Tidle (Step S102), and then clears the period of time counted by the bus load counter 125 (Step S103).

Next, the control unit 13 calculates the bus load (Tbus) that shows a ratio of the period of time during which the CAN bus 20A is transmitting or receiving signals to/from the GW 10 to the all measurement periods of time (Tall) as follows (Step S104).

bus load (Tbus)=(all measurement periods of time (Tall)−bus load counter (Tidle))/all measurement periods of time (Tall)

Next, the control unit 13 determines whether the bus load (Tbus) is equal to or larger than the upper limit value or equal to or smaller than the lower limit value in a predetermined range (Step S105). In the case where the bus load (Tbus) is neither equal to or larger than the upper limit value nor equal to or smaller than the lower limit value (No in Step S105), the flow returns to Step S101.

In the case where the bus load (Tbus) is equal to or larger than the upper limit value or equal to or smaller than the lower limit value in Step S105 (Yes in Step S105), the control unit 13 determines that the load of the CAN bus 20A is abnormally increased or decreased to perform a predetermined bus load abnormality process (Step S106). After completion of the bus load abnormality process, the flow returns to Step S101. The bus load abnormality process performed by the control unit 13 is a process of adjusting the load of the CAN bus 20A or a process of diagnosing the GW 10 and the ECU 30A by controlling the transmission amount of signals in the ECU 30A coupled to the CAN bus 20A.

It should be noted that a processing flow of a process performed by the GW 10 on the basis of the monitoring result of the load of the CAN bus 20B is also the same as that shown in FIG. 13 in the first embodiment.

Effect of First Embodiment

As described above, according to the first embodiment, the bus load monitoring unit 12A of the GW 10 includes the determination circuit 123 that determines whether the GW 10 is in the normal state or the bus-off state, the monitoring circuit 121 that monitors the load of the CAN bus 20A when the GW 10 is in the normal state, the monitoring circuit 122 that monitors the load of the CAN bus 20A when the GW 10 is in the bus-off state, and the switching circuit 124 that switches the monitoring circuit monitoring the load of the CAN bus 20A to the monitoring circuit 121 or the monitoring circuit 122 on the basis of the determination result of the determination circuit 123.

Specifically, the monitoring circuit 121 determines that the CAN bus 20A is in the idle state in the case where the transmitting status does not indicate that signals are being transmitted and the receiving status does not indicate that signals are being received when the GW 10 is in the normal state. In addition, the monitoring circuit 122 determines that the CAN bus 20A is in the idle state in the case where 11 or more recessive bits are detected in the reception signal Rx received from the CAN bus 20A by the GW 10 when the GW 10 is in the bus-off state.

Therefore, even in the case where the GW 10 becomes the bus-off state and the monitoring circuit 121 cannot monitor the load of the CAN bus 20A with high accuracy, the monitoring circuit 122 can monitor the load of the CAN bus 20A with high accuracy. Accordingly, it is possible to monitor the load of the CAN bus 20A with high accuracy.

Further, since the bus load monitoring unit 12B has the same configuration as the bus load monitoring unit 12A, it is possible to monitor the load of the CAN bus 20B with high accuracy.

(2) Second Embodiment

In the first embodiment, the ECU 30A has the CAN IP on the premise that the ECU 30A participates in communications of the CAN bus 20A. Therefore, the ECU 30A has an additional bus load monitoring unit similar to the bus load monitoring unit 12A according to the first embodiment, so that the load of the CAN bus 20A can be monitored.

However, although the ECU 30A does not participate in communications of the CAN bus 20A, there is a case that the ECU 30A needs to monitor the load of the CAN bus 20A. In this case, since the ECU 30A does not participate in communications of the CAN bus 20A, the ECU 30A has no CAN IP. Therefore, even if the ECU 30A has an additional bus load monitoring unit similar to the bus load monitoring unit 12A according to the first embodiment, the load of the CAN bus 20A cannot be monitored.

Further, in the case where the ECU 30B also has no CAN IP, even if the ECU 30B has an additional bus load monitoring unit similar to the bus load monitoring unit 12B according to the first embodiment, the load of the CAN bus 20B cannot be monitored.

In a second embodiment, the ECU 30A having no CAN IP can monitor the load of the CAN bus 20A, and the ECU 30B having no CAN IP can monitor the load of the CAN bus 20B.

Therefore, in the second embodiment, the configurations of the ECU 30A and 30B are different from those of the first embodiment, and the entire configuration of the communication system and the configuration of the GW 10 are the same. Therefore, the configurations of the communication system and the GW 10 will not be described below.

<ECUs 30A and 30B According to Second Embodiment>

Hereinafter, the ECUs 30A and 30B according to the second embodiment will be described. In the second embodiment, it is assumed that the ECUs 30A are mixed such that some ECUs 30A have CAN IPs and participate in communications of the CAN bus 20A and other ECUs 30A have no CAN IPs and only monitor the load of the CAN bus 20A. In addition, it is assumed that the ECUs 30B are mixed such that some ECUs 30B have CAN IPs and participate in communications of the CAN bus 20B and other ECUs 30B have no CAN IPs and only monitor the load of the CAN bus 20B.

Hereinafter, the configuration of the ECU 30A having no CAN IP and only monitoring the load of the CAN bus 20A and the configuration of the ECU 30B having no CAN IP and only monitoring the load of the CAN bus 20B will be described.

It should be noted that such ECUs 30A and 30B monitor different CAN buses, but the configurations thereof are the same. Therefore, the configuration of the ECU 30A will be described as an example in the following description, and the explanation of the configuration of the ECU 30B will be omitted.

<Configuration of ECU 30A According to Second Embodiment>

A configuration example of the ECU 30A according to the second embodiment will be described with reference to FIG. 14. The ECU 30A shown in FIG. 14 is an ECU that has no CAN IP and only monitors the load of the CAN bus 20A. The ECU 30A includes a bus load monitoring unit 31 and a control unit 32. The ECU 30A shown in FIG. 14 is an example of a second bus load monitoring device.

The bus load monitoring unit 31 is a module that monitors the load of the CAN bus 20A. Since the ECU 30A has no CAN IP, the ECU 30A cannot participate in communications of the CAN bus 20A, but can receive a signal transmitted to the CAN bus 20A by the other ECU 30A or the GW 10 coupled to the CAN bus 20A as a reception signal Rx. Accordingly, the bus load monitoring unit 31 monitors the load of the CAN bus 20A by using the reception signal Rx. It should be noted that the bus load monitoring unit 31 obtains the reception signal Rx through a signal #1 from the CAN bus 20A, and obtains a CAN clock through a signal #2.

The control unit 32 is a module that controls the bus load monitoring unit 31.

<Configuration of Bus Load Monitoring Unit 31 According to Second Embodiment>

Figure 15:
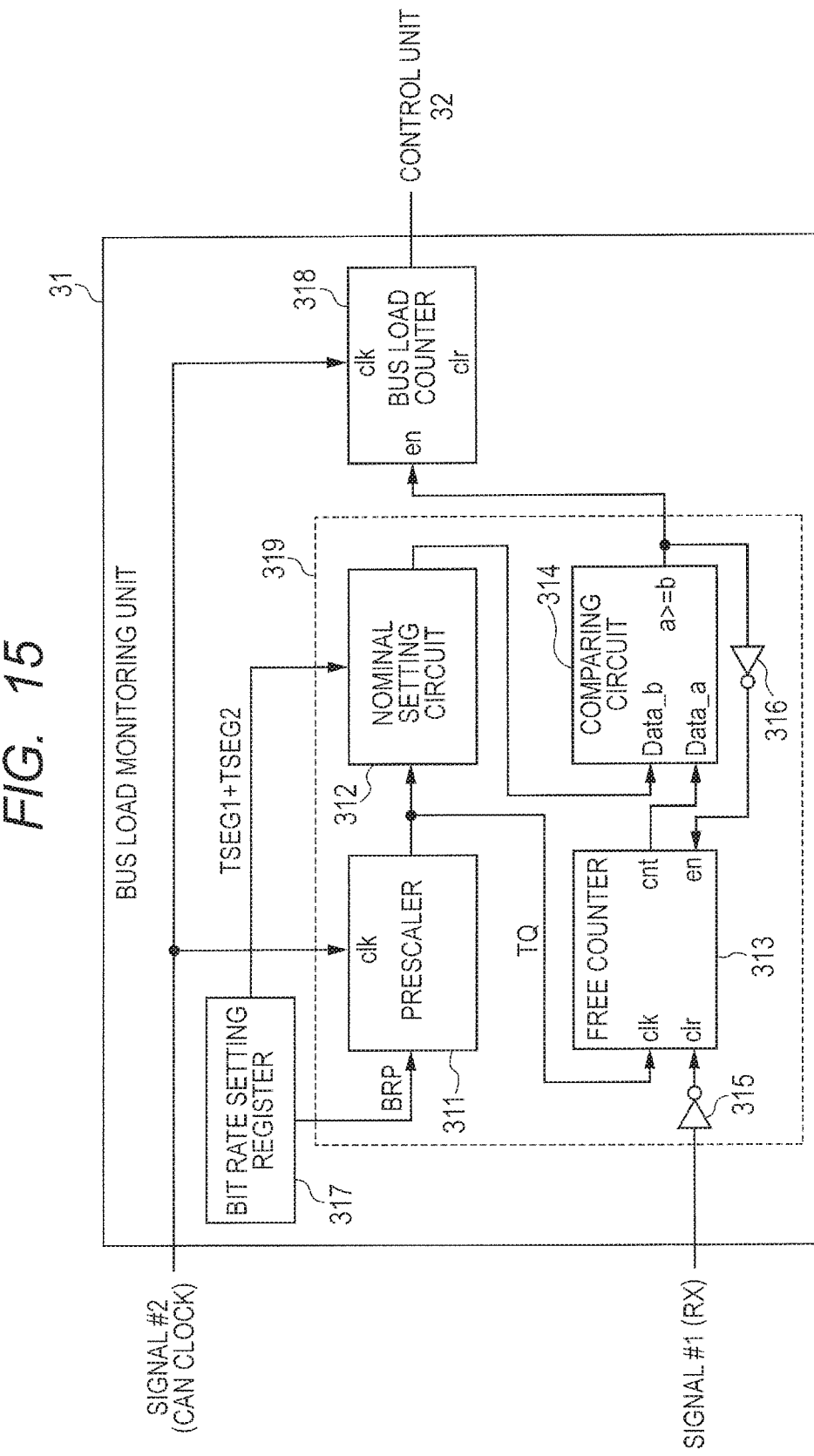
FIG. 15 is a diagram for showing a configuration example of a bus load monitoring unit in the ECU according to the second embodiment.

Next, a configuration example of the bus load monitoring unit 31 according to the second embodiment will be described with reference to FIG. 15. As shown in FIG. 15, the bus load monitoring unit 31 according to the second embodiment includes a prescaler 311, a nominal setting circuit 312, a free counter 313, a comparing circuit 314, NOT circuits 315 and 316, a bit rate setting register 317, and a bus load counter 318. Of these, the prescaler 311, the nominal setting circuit 312, the free counter 313, the comparing circuit 314, and the NOT circuits 315 and 316 configure a monitoring circuit 319. The monitoring circuit 319 is an example of a third monitoring circuit. The bus load counter 318 is an example of a second bus load counter.

The monitoring circuit 319 is the same as the monitoring circuit 122 according to the first embodiment. Namely, the prescaler 311, the nominal setting circuit 312, the free counter 313, the comparing circuit 314, and the NOT circuits 315 and 316 are the same as the prescaler 1221, the nominal setting circuit 1222, the free counter 1223, the comparing circuit 1224, and the NOT circuits 1225 and 1226 of the first embodiment, respectively.

The bit rate setting register 317 is the same as that included in the CAN IP of the first embodiment. In the second embodiment, since the ECU 30A has no CAN IP, the bus load monitoring unit 31 has the bit rate setting register 317.

Therefore, the output of the monitoring circuit 319 (comparing circuit 314) is the same as the output of the monitoring circuit 122 (comparing circuit 1224) according to the first embodiment. Namely, in the case where 11 or more recessive bits are detected in the reception signal Rx received from the CAN bus 20A by the ECU 30A, the output of the monitoring circuit 319 becomes "1".

The bus load counter 318 counts the period of time during which "1" is output from the monitoring circuit 319 in synchronization with the CAN clock. Namely, the bus load counter 318 determines that the CAN bus 20A is in the idle state in the period of time during which the 11 or more recessive bits are detected in the reception signal Rx, and counts the period of time.

The control unit 32 sets the period of time counted by the bus load counter 318 to Tidle, a bus load (Tbus) that shows a ratio of the period of time during which the CAN bus 20A is transmitting or receiving signals to/from the ECU 30A of the CAN bus 20A to all measurement periods of time can be calculated as similar to the control unit 13 according to the first embodiment.

Further, in the case where the bus load (Tbus) is equal to or larger than the upper limit value or equal to or smaller than the lower limit value, the control unit 32 can perform a predetermined bus load abnormality process as similar to the control unit 13 according to the first embodiment. It should be noted that the bus load abnormality process performed by the control unit 32 is, for example, a process of notifying that the load of the CAN bus 20A is abnormal to the outside.

Effect of Second Embodiment

As described above, according to the second embodiment, in the case where the 11 or more recessive bits are detected in the reception signal Rx received from the CAN bus 20A by the ECU 30A, the bus load monitoring unit 31 of the ECU 30A determines that the CAN bus 20A is in the idle state.

Therefore, the ECU 30A can monitor the load of the CAN bus 20A with high accuracy even if the ECU 30A has no CAN IP.

Further, the ECU 30B can also monitor the load of the CAN bus 20B with high accuracy because the configuration of the ECU 30B is the same as that of the ECU 30A.

The other effects are the same as those in the first embodiment.

(3) Third Embodiment

In a third embodiment, in the case where the monitored load of the CAN bus 20A or 20B is abnormally increased or decreased, the GW 10 can specify a failure part causing the abnormality.

Therefore, in the third embodiment, the configuration of the GW 10 is different from that of each of the first and second embodiments, and the entire configuration of the communication system and the configurations of the ECUs 30A and 30B are the same. Therefore, the configurations of the communication system and the ECUs 30A and 30B will not be described below.

In addition, in the third embodiment, only the configurations of the bus load monitoring units 12A and 12B in the configuration of the GW 10 are different from those of the first and second embodiments. Therefore, only the configurations of the bus load monitoring units 12A and 12B will be described below. Further, the bus load monitoring units 12A and 12B monitor different CAN buses, but the configurations thereof are the same. Therefore, the configuration of the bus load monitoring unit 12A will be described as an example in the following description, and the explanation of the configuration of the bus load monitoring unit 12B will be omitted.

<Configuration of Bus Load Monitoring Unit 12A According to Third Embodiment>

Figure 16:
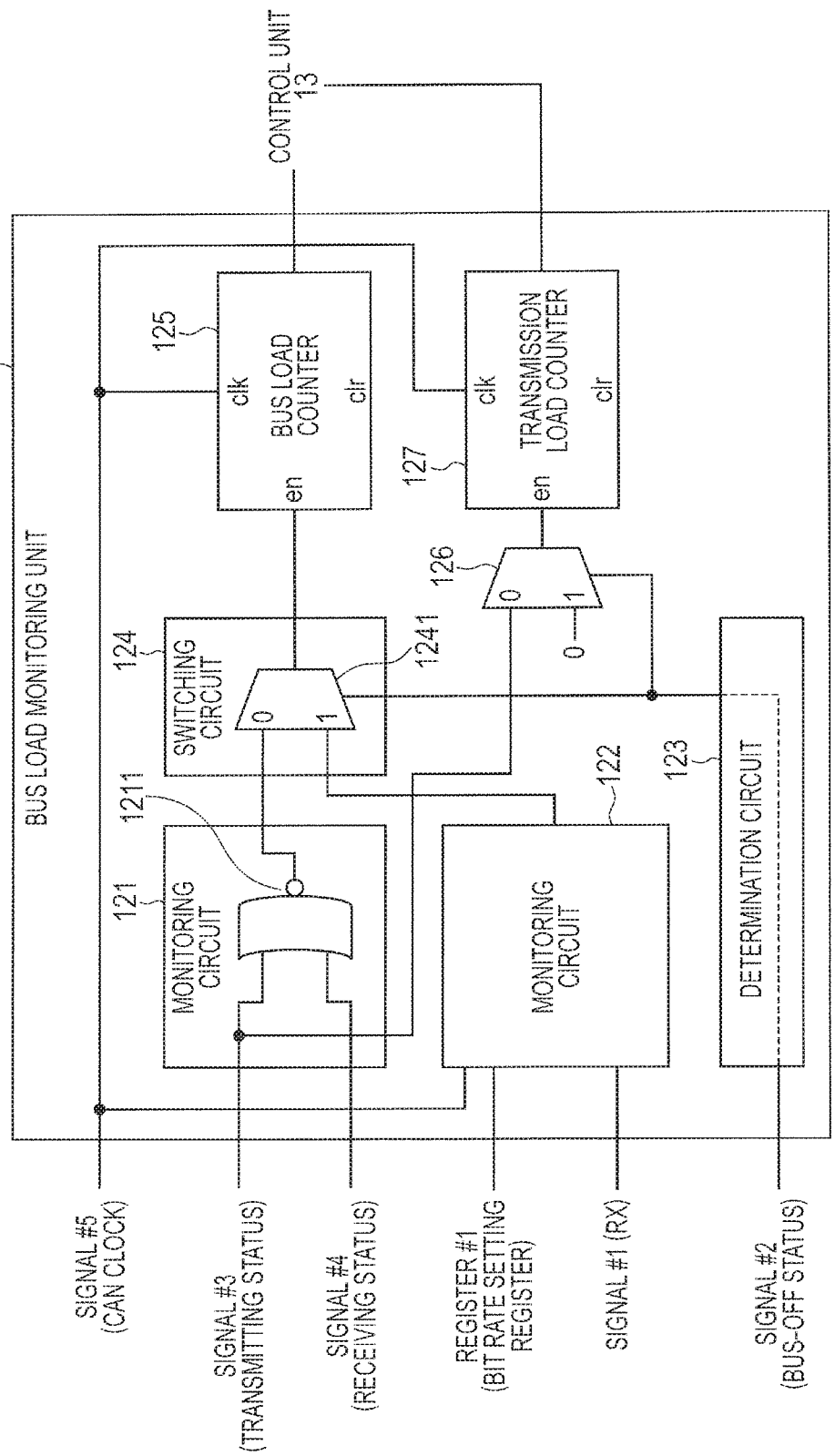
FIG. 16 is a diagram for showing a configuration example of a bus load monitoring unit in a GW according to a third embodiment.

A configuration example of the bus load monitoring unit 12A according to the third embodiment will be described with reference to FIG. 16. As shown in FIG. 16, the bus load monitoring unit 12A is additionally provided with a selector 126 and a transmission load counter 127 as compared to the configuration according to the first embodiment shown in FIG. 9, and the other configurations are the same. Further, the internal configuration of the monitoring circuit 122 is also the same as that shown in FIG. 10.

If the output of the determination circuit 123 is "1", the selector 126 selects and outputs "0". If the output of the determination circuit 123 is "0", the selector 126 selects and outputs the transmitting status. Here, "1" of the output of the determination circuit 123 indicates the bus-off state, and "0" indicates the normal state. Further, "1" of the transmitting status indicates that signals are being transmitted. Therefore, in the case where the transmitting status indicates that signals are being transmitted when the GW 10 is in the normal state, the selector 126 outputs "1".

The transmission load counter 127 counts the period of time during which "1" is output from the selector 126 in synchronization with the CAN clock. Namely, the transmission load counter 127 counts the period of time during which the transmitting status indicates that signals are being transmitted when the GW 10 is in the normal state.

<Processing Flow of GW 10 According to Third Embodiment>

Figure 17:
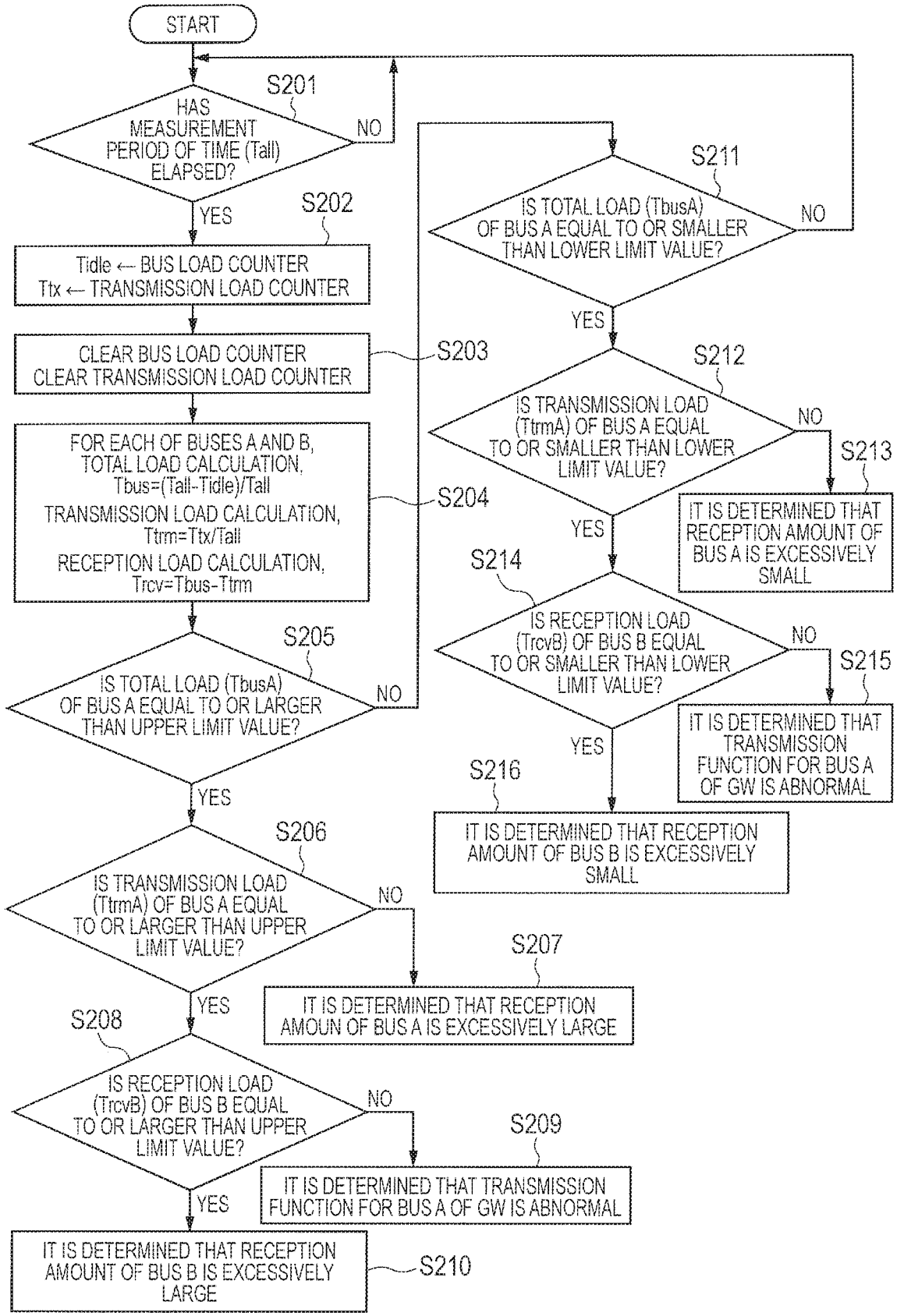
FIG. 17 is a flowchart for showing an example of a processing flow of the GW according to the third embodiment.

Next, an example of a processing flow of the GW 10 according to the third embodiment will be described with reference to FIG. 17. It should be noted that FIG. 17 shows a processing flow of a process that is performed on the basis of the monitoring result of the load of the CAN bus 20A. In addition, the CAN bus 20A and the CAN bus 20B are denoted as a bus A and a bus B, respectively, in FIG. 17.

As shown in FIG. 17, the control unit 13 determines whether or not a predetermined measurement period of time (Tall) has elapsed (Step S201). In the case where the measurement period of time (Tall) has not elapsed (No in Step S201), the flow returns to Step S201.

In the case where the measurement period of time (Tall) has elapsed (Yes in Step S201) in Step S201, the control unit 13 sets the period of time counted by the bus load counter 125 of the bus load monitoring unit 12A at that time to TidleA and sets the period of time counted by the bus load counter 125 of the bus load monitoring unit 12B at that time to TidleB. Further, the control unit 13 sets the period of time counted by the transmission load counter 127 of the bus load monitoring unit 12A at that time to TtxA and sets the period of time counted by the transmission load counter 127 of the bus load monitoring unit 12B at that time to TtxB (Step S202).

Next, the control unit 13 clears the periods of time counted by both the bus load counters 125 of the bus load monitoring units 12A and 12B, and clears the periods of time counted by both the transmission load counters 127 of the bus load monitoring units 12A and 12B (Step S203).

Next, the control unit 13 performs the following calculation (Step S204).

First, the control unit 13 calculates a total load (TbusA) that shows a ratio of the period of time during which the CAN bus 20A is transmitting or receiving signals to/from the GW 10 to the all measurement periods of time (Tall) as follows. Further, the control unit 13 calculates a total load (TbusB) that shows a ratio of the period of time during which the CAN bus 20B is transmitting or receiving signals to/from the GW 10 to the all measurement periods of time (Tall).

total load (TbusA) of CAN bus 20A=(all measurement periods of time (Tall)−bus load counter (TidleA))/all measurement periods of time (Tall)

total load (TbusB) of CAN bus 20B=(all measurement periods of time (Tall)−bus load counter (TidleB))/all measurement periods of time (Tall)

Next, the control unit 13 calculates a transmission load (TtrmA) that shows a ratio of the period of time during which the GW 10 is transmitting signals to the CAN bus 20A to the all measurement periods of time (Tall) as follows. Further, the control unit 13 calculates a transmission load (TtrmB) that shows a ratio of the period of time during which the GW 10 is transmitting signals to the CAN bus 20B to the all measurement periods of time (Tall).

transmission load (TtrmA) of CAN bus 20A=transmission load counter (TtxA)/all measurement periods of time (Tall)

transmission load (TtrmB) of CAN bus 20B=transmission load counter (TtxB)/all measurement periods of time (Tall)

Next, the control unit 13 calculates a reception load (TrcvA) that shows a ratio of the period of time during which the GW 10 is receiving signals from the CAN bus 20A to the all measurement periods of time (Tall) as follows. Further, the control unit 13 calculates a reception load (TrcvB) that shows a ratio of the period of time during which the GW 10 is receiving signals from the CAN bus 20B to the all measurement periods of time (Tall).

reception load (*TrcvA*) of CAN bus 20*A*=total load (*TbusA*) of CAN bus 20*A*-transmission load (*TtrmA*) of CAN bus 20*A* reception load (*TrcvB*) of CAN bus 20*B*=total load (*TbusB*) of CAN bus 20*B*-transmission load (*TtrmB*) of CAN bus 20*B*

Next, the control unit 13 determines whether or not the total load (TbusA) of the CAN bus 20A is equal to or larger than the upper limit value of a first predetermined range (Step S205).

In Step S205, in the case where the total load (TbusA) of the CAN bus 20A is equal to or larger than the upper limit value (Yes in Step S205), the control unit 13 determines that the load of the CAN bus 20A is abnormally increased, and then determines whether or not the transmission load (TtrmA) of the CAN bus 20A is equal to or larger than the upper limit value of a second predetermined range (a range lower than the first predetermined range) (Step S206). In the case where the transmission load (TtrmA) of the CAN bus 20A is not equal to or larger than the upper limit value (No in Step S206), the control unit 13 determines that the reception amount of signals received from the CAN bus 20A by the GW 10 is excessively large (Step S207).

In Step S206, in the case where the transmission load (TtrmA) of the CAN bus 20A is equal to or larger than the upper limit value (Yes in Step S206), the control unit 13 then determines whether or not the reception load (TrcvB) of the CAN bus 20B is equal to or larger than the upper limit value of a third predetermined range (a range lower than a fourth predetermined range (corresponding to the first predetermined range) related to the total load (TbusB) of the CAN bus 20B) (Step S208). In the case where the reception load (TrcvB) of the CAN bus 20B is not equal to or larger than the upper limit value (No in Step S208), the control unit 13 determines that the transmission function of signals to the CAN bus 20A in the GW 10 is abnormal (Step S209). In the case where the reception load (TrcvB) of the CAN bus 20B is equal to or larger than the upper limit value (Yes in Step S208), the control unit 13 determines that the reception amount of signals received from the CAN bus 20B by the GW 10 is excessively large (Step S210).

In Step S205, in the case where the total load (TbusA) of the CAN bus 20A is not equal to or larger than the upper limit value (No in Step S205), the control unit 13 then determines whether or not the total load (TbusA) of the CAN bus 20A is equal to or smaller than the lower limit value of the first predetermined range (Step S211). In the case where the total load (TbusA) of the CAN bus 20A is not equal to or smaller than the lower limit value (No in Step S211), the flow returns to Step S201.

In Step S211, in the case where the total load (TbusA) of the CAN bus 20A is equal to or smaller than the lower limit value (Yes in Step S211), the control unit 13 determines that the load of the CAN bus 20A is abnormally decreased, and then determines whether or not the transmission load (TtrmA) of the CAN bus 20A is equal to or smaller than the lower limit value of the second predetermined range (Step S212). In the case where the transmission load (TtrmA) of the CAN bus 20A is not equal to or smaller than the lower limit value (No in Step S212), the control unit 13 determines that the reception amount of signals received from the CAN bus 20A by the GW 10 is excessively small (Step S213).

In Step S212, in the case where the transmission load (TtrmA) of the CAN bus 20A is equal to or smaller than the lower limit value (Yes in Step S212), the control unit 13 then determines whether or not the reception load (TrcvB) of the CAN bus 20B is equal to or smaller than the lower limit value of the third predetermined range (Step S214). In the case where the reception load (TrcvB) of the CAN bus 20B is not equal to or smaller than the lower limit value (No in Step S214), the control unit 13 determines that the transmission function of signals to the CAN bus 20A in the GW 10 is abnormal (Step S215). In the case where the reception load (TrcvB) of the CAN bus 20B is equal to or smaller than the lower limit value (Yes in Step S214), the control unit 13 determines that the reception amount of signals received from the CAN bus 20B by the GW 10 is excessively small (Step S216).

As described above, the control unit 13 determines whether or not the load of the CAN bus 20A is abnormal (whether the load is abnormally increased or decreased) on the basis of the total load (TbusA) of the CAN bus 20A. Then, in the case where it is determined that the load of the CAN bus 20A is abnormal, the control unit 13 determines whether or not the reception amount of signals received from the CAN bus 20A by the GW 10 is abnormal (whether the reception amount is excessively large or small) on the basis of the transmission load (TtrmA) of the CAN bus 20A. Then, in the case where it is determined that the reception amount of signals received from the CAN bus 20A by the GW 10 is not abnormal, the control unit 13 determines whether or not the reception amount of signals received from the CAN bus 20B by the GW 10 is abnormal (whether the reception amount is excessively large or small) on the basis of the reception load (TrcvB) of the CAN bus 20B. Then, in the case where it is determined that the reception amount of signals received from the CAN bus 20B by the GW 10 is not abnormal, the control unit 13 determines that the transmission function of signals to the CAN bus 20A in the GW 10 is abnormal.

It should be noted that the second predetermined range and the third predetermined range may be the same or different from each other in FIG. 17. Further, in the case where the second predetermined range and the third predetermined range are different from each other, the second predetermined range may be higher than the third predetermined range, or the third predetermined range may be higher than the second predetermined range.

Further, the total loads, the transmission loads, and the reception loads of the CAN buses 20A and 20B are calculated in advance in Step S204, but the present invention is not limited to this. For example, only the total load of the CAN bus 20A may be calculated in Step S204, the transmission load of the CAN bus 20A may be calculated when the flow proceeds to Steps S206 and S212, and the reception load of the CAN bus 20B may be calculated when the flow proceeds to Steps S208 and S214.

It should be noted that a processing flow of a process performed by the GW 10 on the basis of the monitoring result of the load of the CAN bus 20B is also the same as that shown in FIG. 13 in the third embodiment.

Effect of Third Embodiment

According to the third embodiment as described above, the bus load monitoring unit 12A of the GW 10 is additionally provided with the transmission load counter 127 that counts the period of time during which the transmitting status indicates that signals are being transmitted when the GW 10 is in the normal state. The bus load monitoring unit 12B also has the same configuration as the bus load monitoring unit 12A.

Therefore, the GW 10 can calculate the total loads, the transmission loads, and the reception loads of the CAN buses 20A and 20B. Accordingly, in the case where it is determined that the load of the CAN bus 20A is abnormal on the basis of the total load of the CAN bus 20A, the GW 10 can determine whether or not the reception amount of signals received from the CAN bus 20A by the GW 10 is abnormal on the basis of the transmission load of the CAN bus 20A. Further, in the case where it is determined that the reception amount of signals received from the CAN bus 20A is not abnormal, the GW 10 can determine whether or not the reception amount of signals received from the CAN bus 20B by the GW 10 is abnormal on the basis of the reception load of the CAN bus 20B. Further, in the case where it is determined that the reception amount of signals received from the CAN bus 20B is not abnormal, the GW 10 can determine that the transmission function of signals to the CAN bus 20A in the GW 10 is abnormal. As described above, in the case where the load of the CAN bus 20A is abnormal, the GW 10 can specify a failure part causing the abnormality.

Further, even in the case where the load of the CAN bus 20B is abnormal, it is possible to specify a failure part causing the abnormality by the same method as described above.

The other effects are the same as in the first embodiment.

The invention achieved by the inventors has been concretely described above on the basis of the embodiments. However, it is obvious that the present invention is not limited to the above-described embodiments, but can be variously changed without departing from the scope thereof. For example, some or all of the first, second, and third embodiments may be combined with each other.

Further, in the first, second, and third embodiments, in the case where 11 or more recessive bits are detected, the GW and the ECU determine that the CAN bus is in the idle state. However, the present invention is not limited to this. In the case where recessive bits having a predetermined bit length (which is not limited to 11 bits) or longer are detected, the GW and the ECU may determine that the CAN bus is in the idle state.

Further, in the above-described third embodiment, the transmission load counter is provided to count the period of time during which the transmitting status indicates that signals are being transmitted when the GW is in the normal state, and the transmission load and the reception load are calculated on the basis of the period of time counted by each of the bus load counter and the transmission load counter. However, the present invention is not limited to this. For example, instead of the transmission load counter, a reception load counter is provided to count the period of time during which the receiving status indicates that signals are being received when the GW is in the normal state and to count the period of time during which the second monitoring circuit (monitoring circuit 122) determines that the CAN bus is not in the idle state when the GW is in the bus-off state, and the transmission load and the reception load may be calculated on the basis of the period of time counted by each of the bus load counter and the reception load counter.

Further, in the above-described first, second, and third embodiments, the functional blocks of the GW and the ECU are realized by hardware, but all or some of the functional blocks of the GW and the ECU may be realized by software such as programs or the like read from a memory. In such a case, the GW and the ECU can be realized by a computer including a processor such as a CPU (Central Processing Unit) that performs an arithmetic process, a control process, and the like, and a memory that stores programs and various kinds of data read and executed by the processor. Therefore, it is understood by those skilled in the art that these functional blocks can be realized in various forms by only hardware, only software, or a combination thereof, and the present invention is not limited to any one of these.

Further, the above-described programs can be stored and supplied to a computer using various types of non-transitory computer readable media. The non-transitory computer readable media include various types of tangible storage media. Examples of the non-transitory computer readable media include a magnetic storage medium (for example, a flexible disc, a magnetic tape, or a hard disk drive), a magneto-optical storage medium (for example, a magneto-optical disc), a CD-ROM (compact disc read only memory), a CD-R (compact disc recordable), a CD-R/W (compact disc rewritable), and a semiconductor memory (for example, a mask ROM, a PROM (programmable ROM), an EPROM (erasable PROM), a flash ROM, or a RAM (random access memory)). Further, the programs may be supplied to a computer by various types of transitory computer readable media. Examples of the transitory computer readable media include an electrical signal, an optical signal, and an electromagnetic wave. The programs can be supplied to a computer by the transitory computer readable media via a wired communication path such as a wire or an optical fiber, or a wireless communication path.

Further, in the above-described first, second, and third embodiments, an example in which each embodiment is applied to the CAN bus has been described. However, the present invention is not limited to the example. Each embodiment can be applied to a bus having the following functions represented by the CAN bus.

(A) A bus-off state is defined as a communication state of a node coupled to a bus.

The bus-off state is a state in which an ECU or a GW is disconnected from the bus and cannot participate in communications of the bus. A CAN IP has an error counter that counts the number of errors in each of transmission and reception, and when the error count number becomes equal to or larger than a predetermined number (256 in the case of the CAN bus), the CAN IP becomes the bus-off state.

(B) In addition to the bus-off state, the following states are defined as the communication states of the node coupled to the bus.

An error active state: A state in which the ECU or the GW is normally coupled to the bus. A state in which the error count number in transmission and reception is 0 to 127 (in the case of the CAN bus).

An error passive state: A state in which the ECU or the GW is normally coupled to the bus, but an error is likely to occur because the error count number in transmission or reception is 128 to 255 (in the case of the CAN bus). A state in which aggressive error notification cannot be made so as not to prevent the communications of the other CAN IPs.

(C) An idle state is defined as the communication state of the bus.

The idle state is a state in which no signals are being transmitted or received.

(D) The recessive bit of logical value 1 and the dominant bit of logical value 0 are transmitted and received on the bus.

What is claimed is:

1. A communication system comprising a first bus load monitoring device coupled to a bus for which, at least, a bus-off state is defined as a communication state,
   wherein the first bus load monitoring device includes:
   a determination circuit that determines whether the first bus load monitoring device is in the bus-off state or in a normal state other than the bus-off state;
   a first monitoring circuit that detects that the bus is in an idle state to monitor the load of the bus when the first bus load monitoring device is in the normal state;
   a second monitoring circuit that detects that the bus is in the idle state to monitor the load of the bus when the first bus load monitoring device is in the bus-off state; and
   a switching circuit that switches a monitoring circuit monitoring the load of the bus to the first monitoring circuit or the second monitoring circuit on a basis of a determination result of the determination circuit.

2. The communication system according to claim 1, wherein the first monitoring circuit determines that the bus is in the idle state in a case where a transmitting status indicating whether or not the first bus load monitoring device is transmitting signals to the bus does not indicate that signals are being transmitted and a receiving status indicating whether or not the first bus load monitoring device is receiving signals from the bus does not indicate that signals are being received when the first bus load monitoring device is in the normal state, and
   wherein the second monitoring circuit determines that the bus is in the idle state in a case where recessive bits having a predetermined bit length or longer are detected in a signal received from the bus by the first bus load monitoring device when the first bus load monitoring device is in the bus-off state.

3. The communication system according to claim 2, wherein the first bus load monitoring device further includes a first bus load counter that counts a period of time during which the first monitoring circuit determines that the bus is in the idle state when the first bus load monitoring device is in the normal state, and counts a period of time during which the second monitoring circuit determines that the bus is in the idle state when the first bus load monitoring device is in the bus-off state.

4. The communication system according to claim 3, wherein the first bus load monitoring device further includes a control unit that determines whether or not the load of the bus is abnormal on a basis of a period of time counted by the first bus load counter, and performs a predetermined process in a case where the load of the bus is abnormal.

5. The communication system according to claim 3, wherein the first bus load monitoring device further includes a transmission load counter that counts a period of time during which a transmitting status indicates that signals are being transmitted when the first bus load monitoring device is in the normal state, or a reception load counter that counts a period of time during which the receiving status indicates that signals are being received when the first bus load monitoring device is in the normal state and counts a period of time during which the second monitoring circuit determines that the bus is not in the idle state when the first bus load monitoring device is in the bus-off state.

6. The communication system according to claim 5, wherein the first bus load monitoring device further includes a control unit that determines whether or not the load of the bus is abnormal on a basis of the period of time counted by the first bus load counter, and determines whether or not a reception amount of signals received from the bus by the first bus load monitoring device is abnormal on a basis of the period of time counted by each of the first bus load counter and the transmission load counter or the reception load counter in a case where the load of the bus is abnormal.

7. The communication system according to claim 6, wherein the first bus load monitoring device includes the determination circuit, the first monitoring circuit, the second monitoring circuit, the switching circuit, the first bus load counter, and the transmission load counter, or the reception load counter that are coupled to another bus other than the bus and are provided for each of the bus and the another bus, and
   wherein the control unit determines whether or not the reception amount of signals received from the another bus by the first bus load monitoring device is abnormal on the basis of the period of time counted by each of the first bus load counter and the transmission load counter, or the reception load counter provided for each of the bus and the another bus in a case where the reception amount of signals received from the bus by the first bus load monitoring device is not abnormal.

8. The communication system according to claim 7, wherein the control unit determines that a function of transmitting signals to the bus in the first bus load monitoring device is abnormal in the case where the reception amount of signals received from the another bus by the first bus load monitoring device is not abnormal.

9. The communication system according to claim 1, wherein a second bus load monitoring device coupled to the bus is further provided, and
   wherein the second bus load monitoring device includes a third monitoring circuit that determines that the bus is in the idle state in a case where recessive bits having a predetermined bit length or longer are detected in a signal received from the bus by the second bus load monitoring device.

10. The communication system according to claim 9, wherein the second bus load monitoring device further includes a second bus load counter that counts a period of time during which the third monitoring circuit determines that the bus is in the idle state.

11. The communication system according to claim 1, wherein the bus comprises a Controller Area Network (CAN) bus.

12. A bus load monitoring device coupled to a bus for which, at least, a bus-off state is defined as a communication state, the bus load monitoring device comprising:
    a determination circuit that determines whether the bus load monitoring device is in the bus-off state or a normal state other than the bus-off state;
    a first monitoring circuit that detects that the bus is in an idle state to monitor the load of the bus when the bus load monitoring device is in the normal state;
    a second monitoring circuit that detects that the bus is in the idle state to monitor the load of the bus when the bus load monitoring device is in the bus-off state; and
    a switching circuit that switches a monitoring circuit monitoring the load of the bus to the first monitoring circuit or the second monitoring circuit on a basis of a determination result of the determination circuit.

13. The bus load monitoring device according to claim 12, wherein the first monitoring circuit determines that the bus is in the idle state in a case where a transmitting status indicating whether or not the bus load monitoring device is transmitting signals to the bus does not indicate that signals are being transmitted and a receiving status indicating whether or not the bus load monitoring device is receiving signals from the bus does not indicate that signals are being received when the bus load monitoring device is in the normal state, and wherein the second monitoring circuit determines that the bus is in the idle state in a case where recessive bits having a predetermined bit length or longer are detected in a signal received from the bus by the bus load monitoring device when the bus load monitoring device is in the bus-off state.

14. The bus load monitoring device according to claim 13, further comprising a bus load counter that counts a period of time during which the first monitoring circuit determines that the bus is in the idle state when the bus load monitoring device is in the normal state, and counts a period of time during which the second monitoring circuit determines that the bus is in the idle state when the bus load monitoring device is in the bus-off state.

15. The bus load monitoring device according to claim 14, further comprising a control unit that determines whether or not the load of the bus is abnormal on a basis of a period of time counted by the bus load counter, and performs a predetermined process in a case where the load of the bus is abnormal.

16. The bus load monitoring device according to claim 14, further comprising a transmission load counter that counts a period of time during which the transmitting status indicates that signals are being transmitted when the bus load monitoring device is in the normal state, or a reception load counter that counts a period of time during which the receiving status indicates that signals are being received when the bus load monitoring device is in the normal state and counts a period of time during which the second monitoring circuit determines that the bus is not in the idle state when the bus load monitoring device is in the bus-off state.

17. The bus load monitoring device according to claim 16, further comprising a control unit that determines whether or not the load of the bus is abnormal on a basis of the period of time counted by the bus load counter, and determines whether or not a reception amount of signals received from the bus by the bus load monitoring device is abnormal on a basis of the period of time counted by each of the bus load counter and the transmission load counter or the reception load counter in the case where the load of the bus is abnormal.

18. The bus load monitoring device according to claim 17, wherein the bus load monitoring device includes the determination circuit, the first monitoring circuit, the second monitoring circuit, the switching circuit, the bus load counter, and the transmission load counter or the reception load counter that are coupled to another bus other than the bus and are provided for each of the bus and the another bus, and wherein the control unit determines whether or not a reception amount of signals received from the another bus by the bus load monitoring device is abnormal on a basis of a period of time counted by each of the bus load counter and the transmission load counter or the reception load counter provided for each of the bus and the another bus in a case where the reception amount of signals received from the bus by the bus load monitoring device is not abnormal.

19. The bus load monitoring device according to claim 18, wherein the control unit determines that a function of transmitting signals to the bus in the bus load monitoring device is abnormal in the case where the reception amount of signals received from the another bus by the bus load monitoring device is not abnormal.

20. A bus load monitoring method by a bus load monitoring device coupled to a bus for which, at least, a bus-off state is defined as a communication state, the device comprising:

a first monitoring circuit that detects that the bus is in an idle state to monitor the load of the bus when the bus load monitoring device is in a normal state other than the bus-off state; and a second monitoring circuit that detects that the bus is in the idle state to monitor the load of the bus when the bus load monitoring device is in the bus-off state, wherein it is determined whether the bus load monitoring device is in the bus-off state or the normal state, and wherein a monitoring circuit, monitoring the load of the bus, is switched to the first monitoring circuit or the second monitoring circuit on a basis of a determination result.

\* \* \* \* \*